United States Patent
Chintawar et al.

(10) Patent No.: US 6,524,550 B1
(45) Date of Patent: Feb. 25, 2003

(54) PROCESS FOR CONVERTING CARBON MONOXIDE AND WATER IN A REFORMATE STREAM

(76) Inventors: Prashant S. Chintawar, 58 Spencer Rd., Boxborough, MA (US) 01719; Craig Thompson, 16 Clinton St., Apartment 2, Marlboro, MA (US) 01752; Mark R. Hagan, 103 Liberty Ave., Apartment No. 1, Somerville, MA (US) 02144

(*) Notice: Subject to any disclaimer, the term of this patent is extended or adjusted under 35 U.S.C. 154(b) by 0 days.

(21) Appl. No.: 09/562,789

(22) Filed: May 2, 2000

Related U.S. Application Data (60) Provisional application No. 60/158,626, filed on Oct. 6, 1999, and provisional application No. 60/132,183, filed on May 3, 1999.

(51) Int. Cl.[7] .................................................. C01B 3/16
(52) U.S. Cl. ........................ 423/650; 423/651; 423/652; 423/655; 423/656
(58) Field of Search ........................ 423/652, 653, 423/654, 655, 656, 650, 651

(56) References Cited

U.S. PATENT DOCUMENTS

| | | |
|---|---|---|
| 3,471,399 A | 10/1969 | O'Hara |
| 3,609,099 A | 9/1971 | Mickelson |
| 3,830,752 A | 8/1974 | Mickelson |
| 4,501,823 A | 2/1985 | Masuda |
| 4,613,584 A | 9/1986 | Schneider et al. |
| 4,721,611 A | 1/1988 | Pinto et al. |
| 4,743,570 A | 5/1988 | Lamont, Jr. |
| 4,844,837 A | 7/1989 | Heck et al. |
| 4,978,513 A | 12/1990 | Baiker et al. |
| 5,030,440 A | * 7/1991 | Lywood et al. ............. 423/655 |
| 5,061,464 A | 10/1991 | Cordonna, Jr. et al. |
| 5,134,109 A | 7/1992 | Uchiyama et al. |
| 5,223,236 A | 6/1993 | Inoue et al. |
| 5,259,754 A | 11/1993 | Dalla Betta et al. |

(List continued on next page.)

FOREIGN PATENT DOCUMENTS

| | | |
|---|---|---|
| EP | 0-406-896 A1 | 7/1990 |
| EP | 0-414-573 A1 | 8/1990 |
| JP | 272136 | 6/1988 |
| JP | 492945 | 7/1992 |
| JP | 558159 | 9/1993 |

OTHER PUBLICATIONS

J. Ladebeck and K. Kochloefl, "Cr–free iron–catalysts for water–gas shift reaction," ©1995 Elsevier Science B.V., pp. 1079–1083, Preparation of Catalysts VI, Scientific Bases for the Preparation of Heterogeneous Catalysts, G. Poncelet et al. (Editors). (no month).

The State of Zirconia Supported Platinum Catalysts for $CO_2CH_4$ Reforming, Bitter/Seshan/Lercher, Journal of Catalysts 171, 279–286 (1997), Article No. CA971792, (no month).

Water–Gas Shift Conversion Using a Feed with a Low Steam to Carbon Monoxide Ratio and Containing Sulphur, Xue/O'Keeffe/Ross, Catalyst Today 30 (1996) 107–118, (no month).

*Primary Examiner*—Wayne A. Langel
(74) *Attorney, Agent, or Firm*—Wallenstein and Wagner, Ltd.

(57) ABSTRACT

A process for converting carbon monoxide and water in a reformate stream into carbon dioxide and hydrogen comprising: generating a reformate by reacting a hydrocarbon via partial oxidation, steam reforming, or both, including autothermal reforming; and promoting a water gas shift in the reformate in the presence of a platinum group metal selected from the group consisting of platinum, palladium, iridium, osmium, rhodium and mixtures thereof, supported on zirconium oxide. The platinum group metal advantageously may be supported directly on a monolithic substrate composed of zirconium oxide.

56 Claims, 5 Drawing Sheets

U.S. PATENT DOCUMENTS

| | | |
|---|---|---|
| 5,318,757 A | 6/1994 | Abe et al. |
| 5,478,528 A | 12/1995 | Golunski et al. |
| 5,500,198 A | 3/1996 | Liu et al. |
| 5,752,996 A | 5/1998 | Kang |
| 5,877,377 A * | 3/1999 | Gocunski et al. ........... 423/656 |
| 6,235,262 B1 * | 4/1999 | Andersen ................... 423/650 |
| 5,904,913 A | 5/1999 | Bohm et al. |
| 5,945,369 A | 8/1999 | Kimura et al. |
| 5,989,457 A | 11/1999 | Seshan et al. |
| 6,048,508 A * | 4/2000 | Dummersdorf et al. ..... 423/655 |
| 6,254,807 B1 * | 7/2001 | Schmidt et al. ............. 423/655 |
| 6,342,197 B1 * | 1/2002 | Senetar et al. ............. 423/652 |
| 6,375,924 B1 * | 4/2002 | Towler et al. ............. 423/656 |

* cited by examiner

PROCESS FOR CONVERTING CARBON MONOXIDE AND WATER IN A REFORMATE STREAM

RELATED APPLICATIONS

This application relies on the priority of U.S. Ser. No. 60/132,183 filed May 3, 1999, and U.S. Ser. No. 60/158,626 filed Oct. 6, 1999.

TECHNICAL FIELD

The present invention relates to methods for producing hydrogen from hydrocarbon fuels and reactors for carrying out the methods; and more particularly to methods, apparatus, and catalysts for conducting water gas shift reactions on a reactant stream of hydrocarbon fuels having been previously reformed by partial oxidation, steam reforming, or both.

BACKGROUND OF THE INVENTION

Reforming of hydrocarbon fuels to make hydrogen is well known in the art. Conventionally, hydrocarbons are reformed predominately in large-scale industrial facilities providing hydrogen for bulk storage and redistribution, or producing hydrogen as an on-line, upstream reagent for another large-scale chemical process. For the most part, these prior processes operate continuously and at steady-state conditions.

More recently, however, a strong interest has developed in providing hydrocarbon-reforming reactors integrated with an end use of the hydrogen. Also, there is a strong interest to develop a low-cost, small-scale source for hydrogen that can replace the need for storing hydrogen gas on site or on board. More particularly, a great interest has developed in providing reactors for producing hydrogen, which can be integrated with a fuel cell which uses hydrogen as a fuel source to generate electricity. Such hydrogen generator/fuel cell systems are being pursued for stationary uses such as providing electrical power to a stationary facility (home or business), for portable electric power uses, and for transportation.

There are many technical requirements for reactors used in such applications, which are not required of traditional large or small-scale hydrogen generating reactors. For example, it is of particular interest to have such a system where the fuel cell can provide "power on demand." Hence, hydrogen must be produced at required variable levels on demand. In other words, the hydrogen producing reactors must be sufficiently dynamic to follow the load. It is also of interest that such systems perform well upon start up and shutdown cycling. In particular, it is desirable to have these integrated systems be stable through repeated on-off cycling, including being ready to come back on-line in a relatively short time after periods of non-use.

Another marked difference between proposed integrated systems and traditional reactors is that there must be sufficient processing in the integrated system itself, and of the hydrocarbon feed stock so as to not only give a yield of hydrogen sufficient to meet the demand, but also to minimize byproducts of reaction including contaminants. In large-scale reactor systems, which produce enormous volumes and run continuously, space, weight, and cost of auxiliary systems is not so critical as in the integrated, smaller-scale reformers, especially those proposed for portable power or transportation applications. For example, carbon monoxide may be considered an undesirable reaction product on board a fuel cell powered automobile. However, in a steady state conventional process, the carbon monoxide can easily be handled by auxiliary separation systems, and may in fact be welcomed for its use in a synthesis gas to make acetic acid, dimethyl ether and alcohols.

In short, the challenge for the smaller-scale, dynamic, integrated processors is the idea that what goes in the reformer must come out at the same end as the desired hydrogen gas. Accordingly, processing has to be more complete and more efficient, while cost effective, lightweight, and durable. The processing must be sufficient to reduce or eliminate species in the product gas which are harmful to the end use (for example, fuel cells) or other down stream components.

Another challenge exists for the proposed integrated systems with respect to the hydrocarbon feed stock. To be of maximum benefit, the proposed integrated systems should be able to use existing infrastructure fuels such as gasoline or diesel fuels. These fuels were not designed as a feed stock for generating hydrogen. Because of this, integrated systems are challenged to be able to handle the wide variety of hydrocarbons in the feed stock. For example, certain reforming byproducts such as olefins, benzene, methyl amide, and higher molecular weight aromatics can cause harm to catalysts used in reforming or purifying steps and may harm the fuel cell itself. Impurities in these fuels such as sulfur and chlorine can also be harmful to reactor catalysts and to the fuel cell.

It is also important to note that a natural byproduct of hydrocarbon reforming is carbon monoxide. Carbon monoxide can poison proton exchange membrane ("PEM") fuel cells, even at very low concentrations, e.g., less than 100 PPM. This poses a problem for an integrated reactor system that is not faced by traditional reforming processes where significant carbon monoxide concentrations are either a useful co-product, or can be separated from the product gas without undue burden on the system economics as a whole.

Also, as noted above, integrated systems proposed to date are expected to transfer the total of the reformate to a fuel cell. Accordingly, techniques which separate carbon monoxide from hydrogen, such as pressure swing adsorption ("PSA") or hydrogen permeable membrane separation, have the deficit of having to provide an alternate means for disposal or storage of the carbon monoxide. Both of the aforementioned techniques also suffer in efficiency as neither converts the carbon monoxide (in the presence of water) to maximize hydrogen production. PSA also suffers from high cost and space requirements. Most notably, PSA presents a likely unacceptable parasitic power burden for portable power or transportation applications. At the same time, hydrogen permeable membranes are expensive, are sensitive to fouling from impurities in the reformate, and reduce the total volume of hydrogen provided to the fuel cell.

At the levels of carbon monoxide present in the reformate stream after partial oxidation, steam reforming or ATR (for example, less than or equal to about 20% carbon monoxide), catalytic techniques such as preferential oxidation ("PROX") or selective methanation are not efficient options. Although it should be noted that PROX and selective methanation may both be appropriate as a secondary, or clean up, process at suitably low carbon monoxide levels. For example, PROX appears to be suitable for oxidizing carbon monoxide at residuals of 20,000 PPM or less.

On the other hand, implementing and using water gas shift reactions does not present the impairments of the above-discussed techniques. Hence use of a water gas shift reactor is highly preferred.

Reformation of hydrocarbons (for example, alcohols, methane, propane, butane, pentane, hexane, and various other gaseous and liquid petroleum fractions saturated and unsaturated, cyclic compounds, aromatic compounds, etc.) may be subjected to some form of partial oxidation to create a reformate enriched in hydrogen. This partial oxidation can be accomplished by a flame-type gas-phase reaction or can be catalytically promoted, for example by a nickel-containing catalyst. Water in the form of steam may be added to prevent coking of the hydrocarbons during oxidation. Reformate composition varies widely with the type of hydrocarbon fuel or feed stock and with the efficacy of the particular partial oxidation process employed. However, reformate generated in this way generally includes varying amounts of carbon monoxide, carbon dioxide, water, nitrogen, trace amounts of hydrogen sulfide, and in the case of partial oxidation, ammonia. Beyond these chemicals, the remainder of the reformate being methane, ethane and depending on the fuel, other higher molecular weight hydrocarbons including: unsaturated and aromatic species; oxygenated species such as ethers, esthers, alcohols, aldehydes, etc.

Steam reforming may also be used to produce hydrogen by promoting the following reaction Equation 1, with a catalyst such as a nickel supported on a refractory material:

$$C_nH_m + nH_2O \rightarrow nCO + (m/2+n)H_2$$

where n=an integer of 1 or greater and m=an integer of 2 or greater, for example, Equation 2:

$$CH_4 + H_2O \rightleftharpoons CO + 3H_2$$

Again, reformate composition resulting from the steam reforming process varies widely with the type of hydrocarbon fuel or feed stock and with the efficacy of the particular catalyst and process parameters employed. Again, however, the reformate generated in this way generally includes (in addition to hydrogen) varying amounts of carbon monoxide, carbon dioxide, and water, with the remainder being methane, ethane and potentially higher molecular weight hydrocarbons including unsaturated and aromatic species, ethers, esthers, alcohols, aldehydes, etc. Depending on the sulfur content of the fuel used, the reformate can include trace amounts of hydrogen sulfide.

It has been proposed to use partial oxidation in combination with steam reforming with the former being upstream of and providing methane-rich reactant feed to the steam reforming step, for example see e.g. WO 98/08771, published Mar. 5, 1998, assigned to Applicant. The coupling of an exothermic partial oxidation reaction with an endothermic steam reforming reaction is sometimes referred to as "autothermal reforming," or "ATR."

Carbon monoxide produced from either partial oxidation or steam reforming can react with water (present from the prior oxidation process or intentionally added to the system) according to the following water-gas-shift (WGS) reaction of Equation 3 to generate more hydrogen:

$$CO + H_2O \rightleftharpoons CO_2 + H_2$$

However, the extent of the WGS reaction is limited by equilibrium concerns. At the elevated temperatures required for steam reformation (typically between 650° C.–980° C.), the purity or yield of hydrogen is limited by the equilibrium. Hence, it has been proposed to subject the feed stream emanating from the steam reforming step to one or more catalytically promoted shift steps. As disclosed in WO 98/08771, such an integrated system provides for a high temperature shift reaction promoted by an iron-containing catalyst, followed by a low temperature shift process promoted by a copper-containing catalyst. In that system, the high temperature shift process takes advantage of relatively higher kinetics at the higher temperature, while sacrificing desired equilibrium. The relatively lower temperature shift process can then take advantage of a more favorable WGS equilibrium to provide a higher yield of hydrogen, while it benefits from the preliminary level of conversion in the high temperature shift.

Problems exist with conventional WGS catalysts, particularly the copper-based and zinc-based catalysts used for so-called "low temperature shift," in an integrated fuel reformer. These catalysts are adversely affected by many of the common reformate species discussed above such as unsaturated and aromatic compounds. These catalysts are also adversely affected by contaminants in the feed stock such as sulfur and halogen compounds, all of which can routinely exist in the reaction gas stream as it enters the "low temperature" shift catalyst down stream of the aforementioned reformer processes in an integrated system.

During startup and shutdown of a dynamic reactor, the frailties of these catalysts are even more pronounced. At start up, the upstream reactors are not up to peak efficiency temperatures and hence there are higher concentrations of (and perhaps more) harmful reactant species produced, such as unsaturated and aromatic compounds, which can poison these catalysts. After shutdown, steam in the system can condense on the catalyst. This condensed steam deactivates these conventional catalysts prematurely by permitting the copper and zinc to mobilize in the liquid phase condensate (i.e., water).

Also, these conventional copper and zinc catalysts must be reduced (usually in situ) by a controlled atmosphere artificially being fed into the reactor to control the rate of reduction to avoid excessive heat which can spoil the catalyst. Once reduced, further burdensome care during manufacture and maintenance of the reactor is needed to avoid contact with oxygen in the air, because these catalysts spontaneously oxidize in the presence of air and release heat during the process. When this happens, the catalyst needs to be reduced again. The subsequent reduction of the catalyst is also exothermic. Ultimately, the heat from exothermic reduction and/or oxidation reduces the catalyst life.

The present invention addresses the above mentioned deficiencies in the art and provides additional advantages as will be disclosed more fully below.

SUMMARY OF THE INVENTION

The present invention is directed to processes and reactors for converting carbon monoxide and steam in a reformate stream into carbon dioxide and hydrogen while employing an improved catalyst. The process includes generating a reformate by reacting a hydrocarbon fuel via partial oxidation, steam reforming, or both. The reformate is then reacted in the presence of a platinum group metal selected from the group consisting of platinum, palladium, iridium, osmium, rhodium or mixtures thereof. According to another aspect of the invention, the platinum group metal is supported on a material selected from the group consisting of an oxide of zirconium, titanium and mixtures thereof. The preferable catalyst and support is $Pt/ZrO_2$. According to another aspect of the invention, a water gas shift reaction can be accomplished in a reformate over a wide range of temperatures (for example, between about 200° C. to about 650° C.) using a single shift catalyst.

According to another aspect of the invention, an advantageous process enhancement includes the step of introducing a predetermined amount of oxygen into the reformate for a desired period of time, oxidizing hydrocarbons, carbon monoxide and hydrogen, in the presence of the catalyst to generate heat to produce a desired temperature in the catalyst. This takes advantage of the heating value of the reformate at start up, when the reformate may not yet be acceptably pure for delivery to the fuel cell.

A reactor according to the invention includes a first reactor section configured to produce reformate by a process selected from the group of partial oxidation, steam reforming, or a combination thereof. A second reactor section is put in communication with the first reactor section so as to receive the reformate. A catalyst is located in the second reactor section. The catalyst comprises a platinum group metal selected from the group consisting of platinum, palladium, iridium, osmium, rhodium and mixtures thereof, and a support material, for the platinum group metal, selected from the group consisting of an oxide of zirconium, titanium and mixtures thereof.

Use of this process and apparatus provides a number of advantages over prior art water gas shift catalysts. For example, the catalyst of the invention can be operated at higher temperatures than conventional "high temperature" shift catalysts containing iron. Catalysts according to the invention are also expected to have a higher activity than iron-containing catalysts. Also, as noted above, commercial Cu/ZnO catalysts or so called "low temperature shift" catalysts can undergo exothermic oxidation and reduction reactions, which in turn, can cause the catalyst temperature to rise to undesirable levels. This is not the case for the catalyst of the invention, because it can be used at relatively lower metal loading due to its activity. The low metal content in the Pt/ZrO2 catalyst, for example, minimizes any temperature rise.

Also it is believed that a strong metal support interaction ("SMSI") occurs between the platinum group metals ("PGM's") and the supports disclosed which aids in structural integrity. Cu/ZnO catalysts are not known to have the added integrity provided by an SMSI interaction.

Apart from the lack of an SMSI structural attribute, Cu/ZnO catalysts are also susceptible to sintering promoted by chlorine and other halogens. The $Pt/ZrO_2$ catalyst should be resistant to this form of deactivation because the melting point of $PtCl_2$ is much higher than the melting point of $CuCl_2$.

According to another broad aspect of the invention, the metal catalyst is deployed on the support without the use a halide salt. The preparation method eliminates the possibility of any leftover halogen on the catalyst. This will prevent any possible problems to the WGS catalyst or any downstream processes caused by halogens. Platinum on $ZrO_2$ (as discussed below) has been tested to date, but other Platinum Group Metals are also expected to work. Transition metals may also benefit from the $ZrO_2$ support and result in a more cost-efficient solution (e.g., $Cu/ZrO_2$).

Notably, the catalyst of the invention does not need a special controlled reducing atmosphere for initial reduction as do the Cu/Zn catalysts. The catalysts of the invention can be reduced (if needed) by the constituents in the reformate stream during normal operation.

It is also believed that other supports capable of producing SMSI effects may be good supports for WGS catalysts according to the invention (e.g., $TiO_2$, etc.).

DETAILED DESCRIPTION OF THE PREFERRED EMBODIMENTS

While this invention is susceptible of embodiment in many different forms, there are shown in the drawings and will herein be described in detail, preferred embodiments of the invention with the understanding that the present disclosure is to be considered as an exemplification of the principles of the invention and is not intended to limit the broad aspect of the invention to the embodiments illustrated.
Preparation of a Test Catalyst A test catalyst of 1% $Pt/ZrO_2$ was prepared by incipient wetness impregnation. According to one aspect of the invention, the platinum salt used in preparing catalysts of the invention would preferably be generally free of halogens, sulfur, arsenic, etc. as these species will not be completely removed by calcination and could cause problems in a fuel processor. Hence, tetra-ammine platinum (II) nitrate, $Pt(NH_3)_4(NO_3)_2$ ("TAPN"), was proposed. Traditional platinum compounds used for catalyst synthesis are hexachloroplatinic acid hexahydrate and platinum (II) chloride. These are relatively inexpensive sources of platinum and are more readily available than TAPN. However, these also contain chlorine which could cause system problems.

The TAPN was acquired and is commercially available from Aldrich Chemical Company, U.S.A. The $ZrO_2$ is available from Norton CPPC (Chemical Process Product Corp.) in 3 mm pellets (Part No. XZ16075). Table 1 provides physical properties of the zirconium oxide used.

TABLE 1

| Physical Properties of Zirconium Oxide Used in Test | |
|---|---|
| Surface Area | ~50 m.²/g. |
| Pore Volume | ~0.3 cm.³/g. |
| Median Pore Diameter | >15 nm. |
| Crush Strength | ~25 lbs. (11 kgs.) |
| Packing Density | 78.4 lbs./ft.³ (1250 kg./m.³) |

The 3 mm. spheres of the zirconium oxide were broken into Tyler 12–14 mesh particles. These particles were then calcined overnight at 400° C. to remove the moisture and other volatile impurities. The water saturation capacity of the pellets was determined as follows. To 3.91 g. of $ZrO_2$ pellets, water was added drop-wise until no more water was absorbed by the pellets. A total of 2.76 g. of water was absorbed. Thus, the water saturation capacity of the $ZrO_2$ was found to be 0.706 g. per g. of $ZrO_2$. The surface area, pore volume, and median pore diameter are important to allow an optimum amount of Pt to be accessible to reactant molecules.

To prepare a 1% Pt/$ZrO_2$, 0.043 g. of TAPN salt was dissolved in 1.5 g water in a Pyrex™ beaker. The solution was warmed on a hot plate until no solid residue was visible at the bottom of the beaker (1–3 mins.) To this solution, 2.13 g. of pre-dried Pt/$ZrO_2$ particles of the Tyler 12–14 mesh were added with constant stirring. All solution was absorbed by the particles. These particles were then dried at room temperature overnight. The particles or granules were then transferred into a flat tray and calcined in an oven using the following sequence: (1) ramp from room temperature to 150° C. at 2° C./min.; (2) held isothermally at 150° C. for 4 hrs.; (3) ramp from 150° C. to 500° C. at 2° C./min.; (4) held at 500° C. for 8hrs.; and (5) furnace shut-down and catalyst permitted to cool within.

Test samples with 0.5%, and 5.0% platinum loading were also prepared in the same manner although the process was scaled appropriately for each metal loading.

Test Reformer

The WGS catalyst testing was performed in a single pass tubular reactor. The reactor itself was a ½" OD (10 mm ID) quartz tube. A quartz frit centered in the tube held the catalyst in place. Catalyst particles were crushed to an average particle diameter of 1.3 mm. A bed volume of approximately 0.75 cm.$^3$ was used, corresponding to a catalyst mass of 0.98 g. The reactor tube was located and controlled within a shell oven. The location of the catalyst bed allowed 6 inches of the tube to provide a preheat for the reactant gases.

Test Reformate

Mass flow controllers set a dry composition and flow rate of the reactant mixture. The gas passed through a humidifier, where humidity level was set by saturating the gas with water at a set temperature. At the reactor exit, a water dropout trap maintained at 0° C. removed moisture from the product stream before entering the gas chromatograph for analysis. A gas chromatograph gave continuous TCD analysis of the product stream, at two-minute intervals. The average concentrations of constituents comprising the test reformate used in the tests described below are disclosed TABLE 2 as volume percent.

TABLE 2

| Test Reformate by Volume Percent | | | | |
|---|---|---|---|---|
| % CO | % $H_2$ | % $CO_2$ | % $N_2$ | % $H_2O$ |
| 2.0 | 29.0 | 14.3 | 31.7 | 23.0 |

Test for Metal Loading

Figure 10:
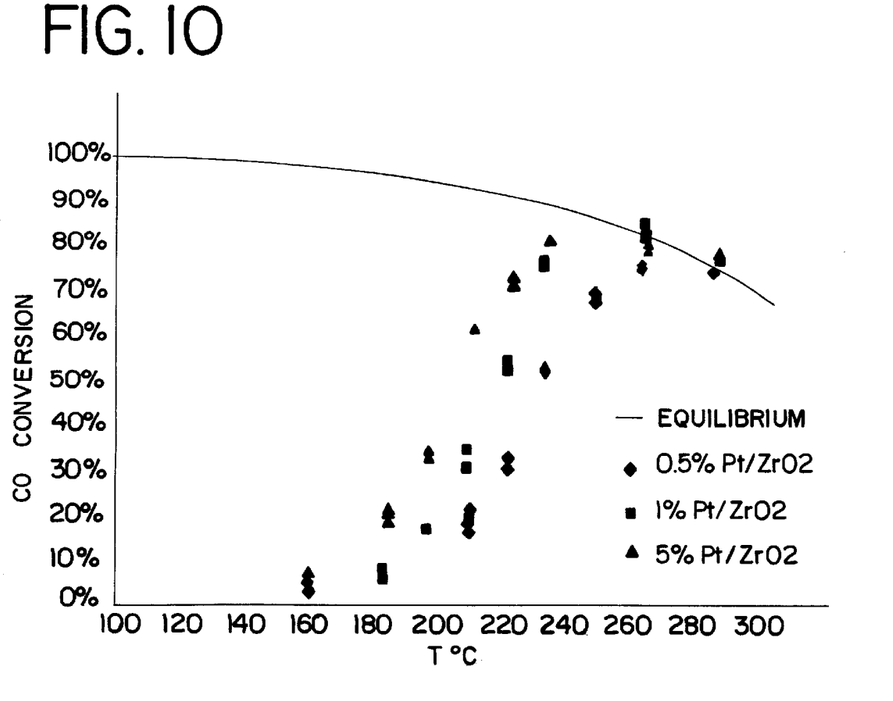

The catalyst used in these tests contained 0.5%, 1.0%, and 5% Pt on $ZrO_2$ by weight. Three tests were conducted to find the optimal precious metal loading. The percentage of carbon monoxide conversion for each metal loading is graphically depicted in FIG. 10. The percentage conversion at 215° C. is tabulated in TABLE 3 for comparison.

TABLE 3

| % Pt | % CO conversion | Normalized Activity |
|---|---|---|
| 0.5% | 18% | 1 |
| 1% | 33% | 0.9 |
| 5% | 61% | 0.3 |

Normalized activity was calculated by choosing 215° C. as a temperature that is not in the equilibrium-controlled regime and shows significant differences in conversion. Values shown are in units of (% conversion) per (weight % Pt). The data show a preferred effective range of loading exists between 0.5% and 5.0%. An even better range with a higher ratio of carbon monoxide conversion to weight of platinum appears to be between 0.5% to 1% platinum. It was also noted that a small amount of methane was detected above 260° C. during the 5% Pt runs, where DGHSV was 8,000.

Test for Cycling Stability and Resistance to Poisoning

A 0.5% Pt/$ZrO_2$ catalyst was made according to the above-described process. Tests were run on the catalyst to determine if: (1) the catalyst would be stable upon cycling between run and shutdown cycles, where water condenses on the catalyst upon cooling after shutdown; and, (2) whether the catalyst would be stable in a reformate stream containing certain species which can routinely appear and are known to be harmful to conventional water-gas-shift catalysts, namely ethylene, benzene, and sulfur.

After four cycles, no measurable activity loss (or deactivation) was seen when the catalyst was cycled between exposure to air and exposure to process conditions. Also, no measurable activity loss was seen during cycles having condensation of water on the catalyst at shutdown.

The 0.5% platinum catalyst was then run in the test reactor separately with each of ethylene, benzene, and hydrogen sulfide. The results are shown in FIGS. 11, 12 and 13.

Figure 11:
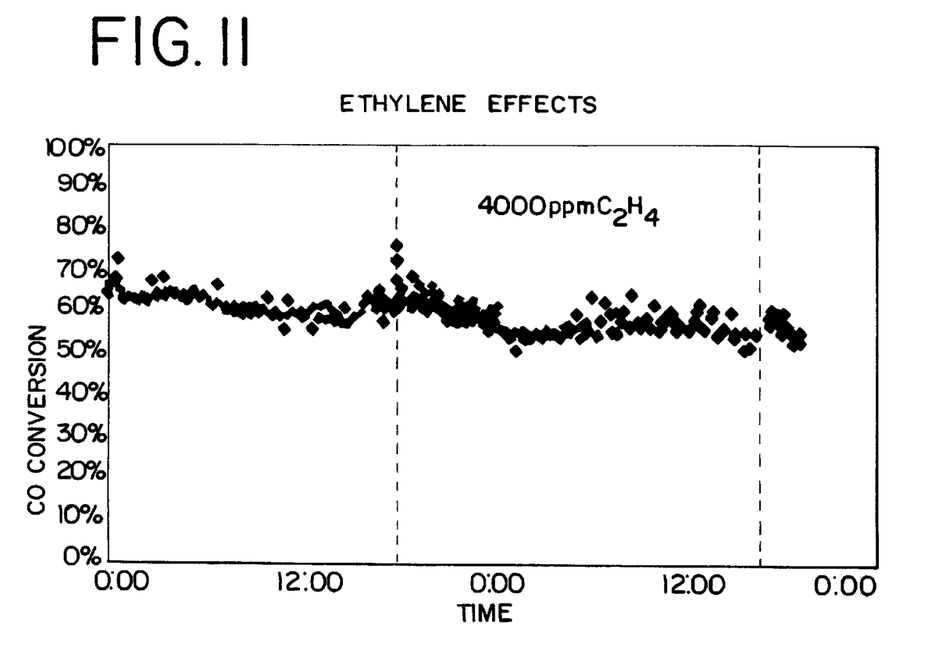
FIG. 11 is a chart disclosing the effect of ethylene on the activity of a catalyst according to the invention.

FIG. 11 graphically shows that exposure to ethylene did not lower catalyst activity, as is seen with conventional WGS catalysts. It was determined by chromatographic analysis that the WGS catalyst hydrogenated the ethylene to ethane, which is less detrimental to downstream processes.

Figure 12:
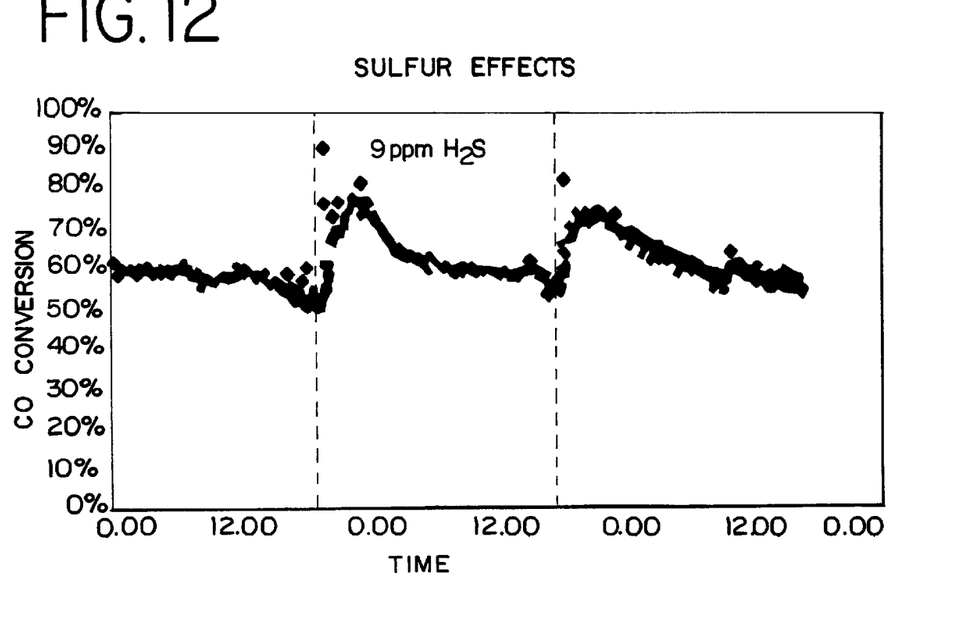
FIG. 12 is a chart disclosing the effect of sulfur on the activity of a catalyst according to the invention; and, FIG. 13 is a chart disclosing the effect of benzene on the activity of a catalyst according to the invention.

As seen in FIG. 12, the addition of hydrogen sulfide to the reactant stream causes a transient in CO conversion, but also shows that the system stabilizes with no activity loss. When the hydrogen sulfide is removed from the feed stream, the system again stabilizes to the original activity level.

Figure 13:
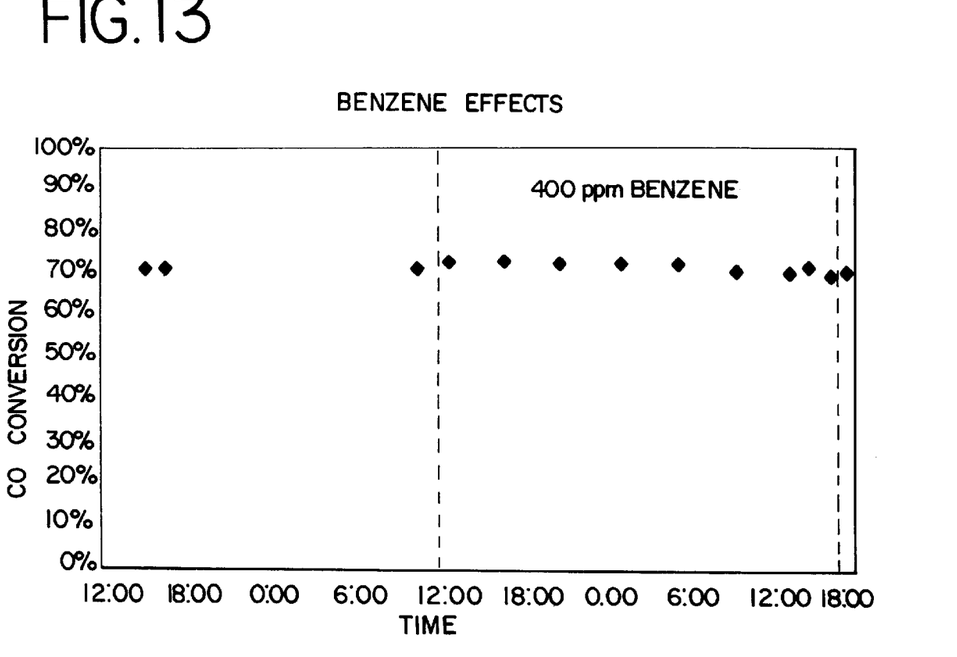

As seen in FIG. 13, no deactivation of the catalyst occurs due to exposure to benzene.

Reactors According to the Invention

In view of the stability and performance of the platinum zirconia catalyst as demonstrated above, the following hydrocarbon reformer reactors disclosed in FIGS. 1–9 are proposed as exemplary configurations according to the invention. In the following FIGS., a reactor section containing a separate POX reactor section followed by a steam reforming reactor section can be interchanged with one so-called "auto-thermal reforming" reactor section.

Figure 1:
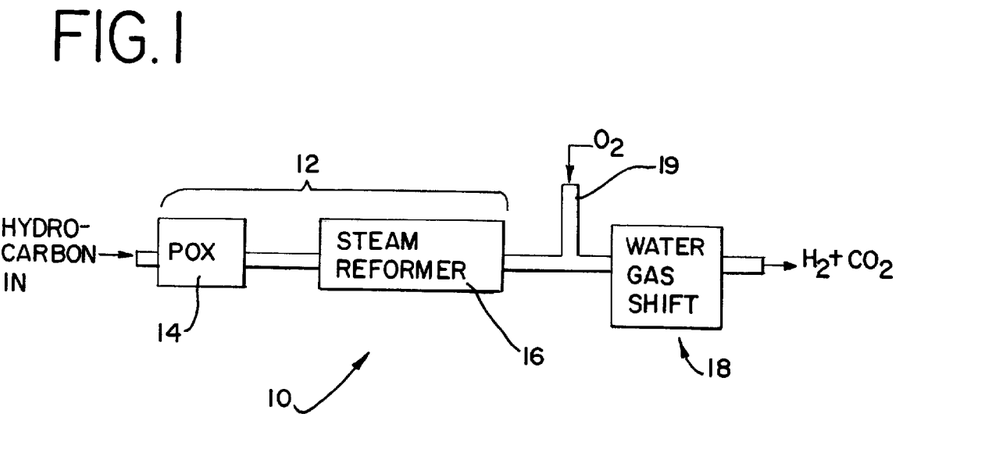
FIG. 1 is a schematic view of a reactor and process according to the present invention.

FIG. 1 discloses a reactor 10 having a first reactor section 12 configured to produce reformate first by partial oxidation of the hydrocarbon ("POX") in a subsection 14 and next a steam reforming of the resultant reaction stream in subsection 16. A second reactor section 18 is in communication with the first reactor section 12 so as to receive the resulting reformate.

Figure 2:
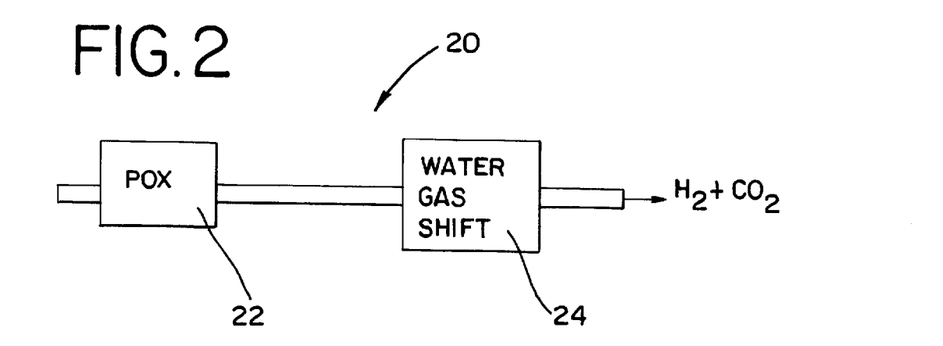
FIG. 2 is a schematic view of another reactor and process according to the present invention.

FIG. 2 discloses another exemplary reformer reactor 20. Reactor 20 includes a first reactor section 22 configured to produce reformate first by partial oxidation of the hydrocarbon(s). A second reactor section 24 is in communication with the first reactor section 22 so as to receive the resulting reformate.

Figure 3:
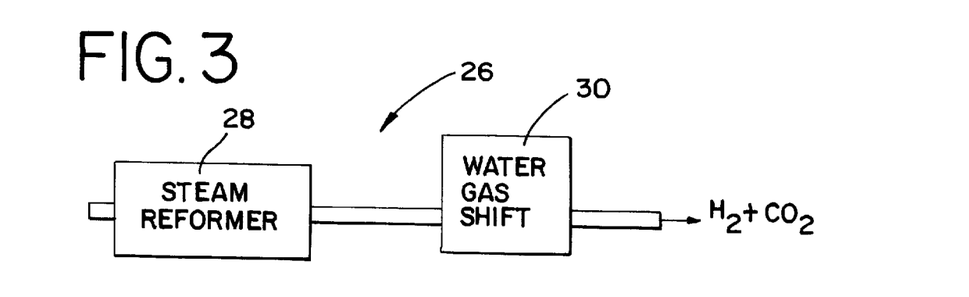
FIG. 3 is a schematic view of another reactor and process according to the present invention.

FIG. 3 discloses a reactor 26 having a first reactor section 28 configured to produce reformate by steam reforming of the hydrocarbon feedstock. A second reactor section 30 is in communication with the first reactor section 28 so as to receive the resulting reformate.

Figure 4:
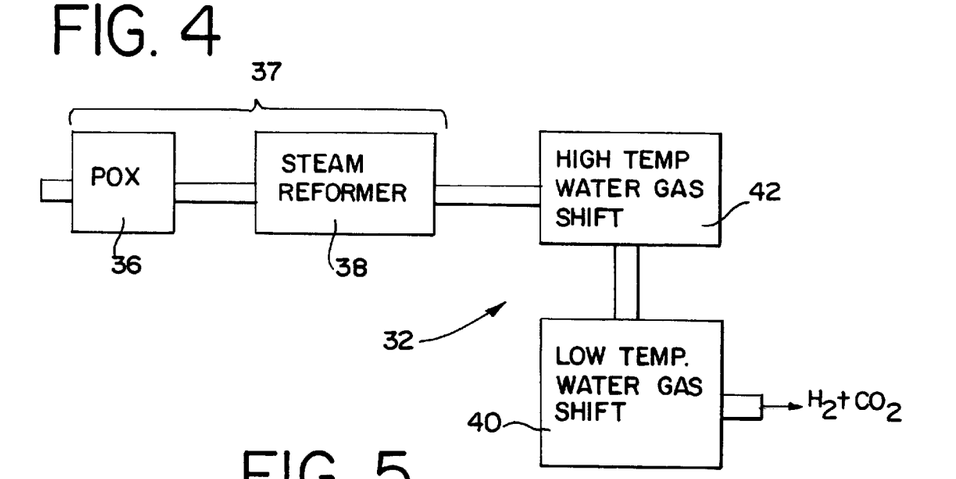
FIG. 4 is a schematic view of another reactor and process according to the present invention.

FIG. 4 discloses a reactor 32 having a first reactor section 37 configured to produce reformate first by partial oxidation of the hydrocarbon in a subsection 36 and next a steam reforming of the resultant reaction stream in subsection 38. A second reactor section 40 is in communication with a third reactor section 42 which is in turn in communication with the first reactor section 37 so as to receive the resulting reformate.

Figure 5:
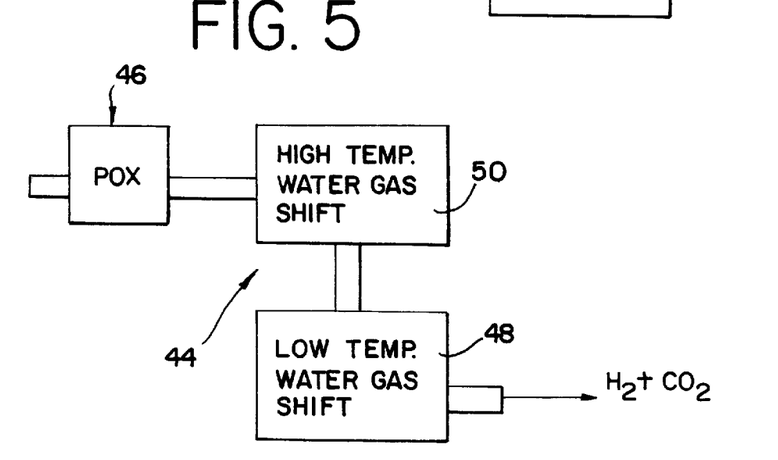
FIG. 5 is a schematic view of another reactor and process according to the present invention.

FIG. 5 discloses a reactor 44 having a first reactor section 46 configured to produce reformate by partial oxidation of the hydrocarbons. A second reactor section 48 is in communication with a third reactor section 50 which is in turn in communication with the first reactor section 46 so as to receive the resulting reformate.

Figure 6:
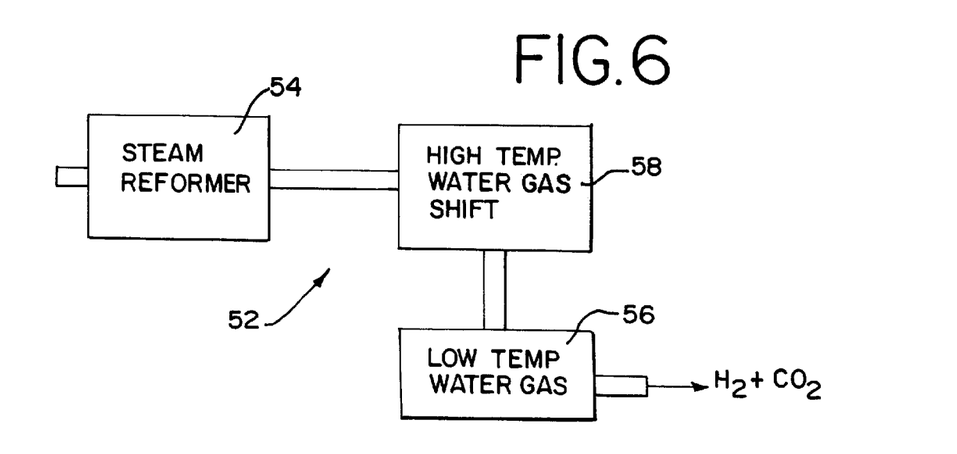
FIG. 6 is a schematic view of another reactor and process according to the present invention.

FIG. 6 discloses a reactor 52 having a first reactor section 54 configured to produce reformate by steam reforming of the hydrocarbons. A second reactor section 56 is in communication with a third reactor section 58 which is in turn in communication with the first reactor section 54 so as to receive the resulting reformate.

Figure 7:
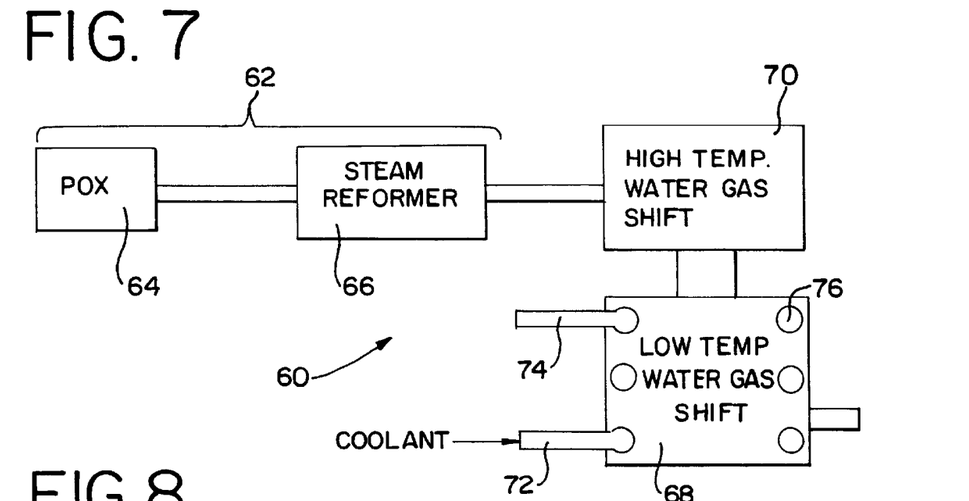
FIG. 7 is a schematic view of another reactor and process according to the present invention.

FIG. 7 discloses a reactor 60 having a first reactor section 62 configured to produce reformate first by partial oxidation of hydrocarbons in a subsection 64 and next a steam reforming of the resultant reaction stream (reformate) in subsection 66. A second reactor section 68 is in communication with a third reactor section 70 which is in turn in communication with the first reactor section 62 so as to receive the resulting reformate.

Figure 8:
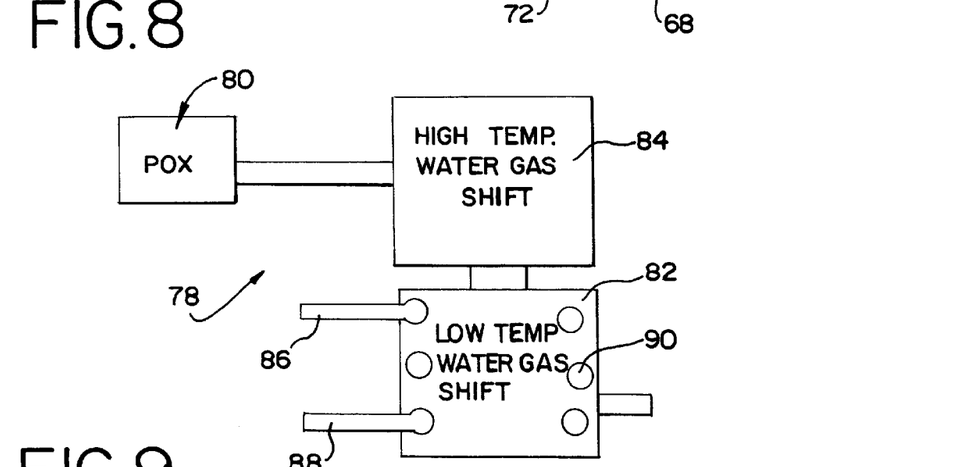
FIG. 8 is a schematic view of another reactor and process according to the present invention.

FIG. 8 discloses a reactor 78 having a first reactor section 80 configured to produce reformate by partial oxidation of the hydrocarbons. A second reactor section 82 is in communication with a third reactor section 84 which is in turn in communication with the first reactor section 80 so as to receive the resulting reformate.

Figure 9:
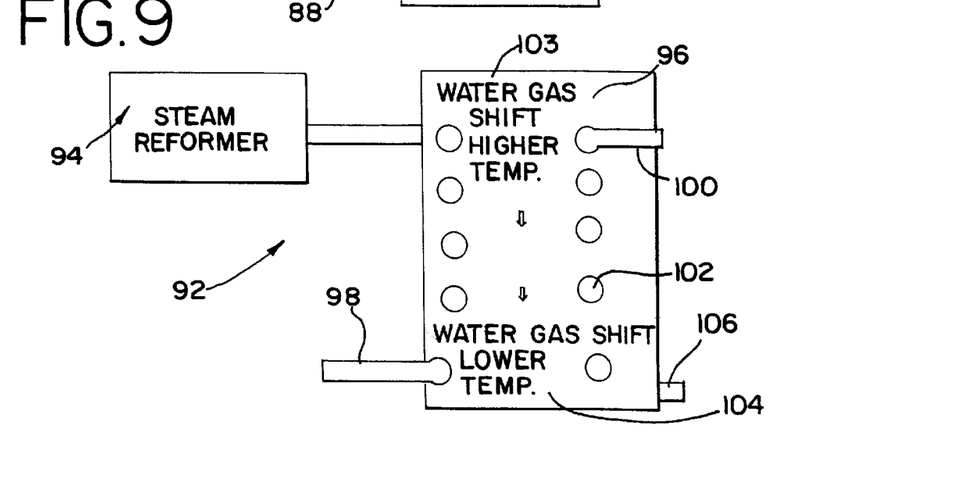
FIG. 9 is a schematic view of another reactor and process according to the present invention; and, FIG. 10 is a chart disclosing activity of a catalyst according to the invention at different metal loadings on a support.

FIG. 9 discloses a reactor 92 having a first reactor section 94 configured to produce reformate by steam reforming of the hydrocarbons. A second reactor section 96 is in communication with the first reactor section 94 so as to receive the resulting reformate.

According to the invention, a catalyst is disposed in the second reactor sections 18, 24, 30, 40, 48, 56, 68, 82 and 96. The catalyst is a platinum group metal ("PGM") selected from the group consisting of platinum, palladium, iridium, osmium, rhodium and mixtures thereof (but preferably is platinum). The PGM is supported on a support material selected from the group consisting of an oxide of zirconium, titanium and mixtures thereof, but preferably zirconium oxide. For $PtzZrO_2$ the metal loading is preferably between 0.5% to 1.0%, platinum. The catalyst and support in reactor sections 8, 24, 30, 40, 48, 56, 68, 82 and 96 may be dispersed upon a monolithic base, or may be deployed on, or in, any other well accepted form coated heat exchanger of support or base such as a powder, granules, pellets, foam, etc. For stationary uses, granules appear to be preferable. However, for uses of reactor in transportation or portable applications, a monolithic base is thought to be preferable. Preferable monoliths are believed to include: foam or reticulate type; cellular or straight channel honeycomb type; rolled corrugates sheet-type; and, extruded channel-type.

According to another aspect of the invention, a monolithic substrate may be fabricated of zirconium oxide. In such a case, the PGM may be support directly on the substrate.

A monolithic base may be wash-coated with zirconium oxide upon which the metal is then dispersed. The metal may be dispersed by any known method such as an incipient wetness method. Regardless of the form in which the catalyst (PGM and support) are deployed (granules, powder, monolith, etc.) the aggregate of the catalyst defines a "body of catalyst" to which reformate can be exposed.

During the heating stage of the incipient wetness method another advantage according to the invention is provided by the use of TAPN versus a halogenated salt. This is because the amines will burn off more easily than halogens bonded to the platinum. It is preferable that the catalyst in any form will be prepared from a non-halogenated salt of the PGM in question.

Preferably, the zirconium support of the preferred embodiment has a surface area approximately about 50 $m.^2/g.$, a pore volume of approximately about 0.3 $cm.^3/g.$, and a median pore diameter greater than about 15 nm. Also, according to one aspect of the invention a catalyst employed in the second reactor section is resistant to poisoning by sulfur, hydrogen sulfide, ethylene, benzene, air and condensed water. The catalyst is stable and active at converting carbon monoxide to carbon dioxide, at temperatures between about 200° C. and 650° C.

The third reactor sections 42, 50, and 58, (FIGS. 4–6) each contain a catalyst other than the catalyst disclosed herein, such as a conventional catalyst suitable for promoting a water gas shift reaction in the reformate. A preferable example of such a catalyst is an iron-containing catalyst, capable of effective carbon monoxide conversion in the temperature range of about 300° C. and 650° C.

According to another aspect of the invention, the second and third reactor sections 42, 50, 58 and 40, 48, 56 can be used cooperatively in a two-part shift process. The reformate can be exposed to the iron-containing catalyst in the third reactor sections 42, 50, and 58 at a relatively high temperature, preferably between 300° C. and 650° C., more preferably between 350° C. and 540° C., and even more preferably between 370° C. and 480° C. In so doing, the process can take advantage of relatively high temperature reaction kinetics as the reformate passes through the "high temperature shift" reactor section. The reactor thus takes advantage of the lower cost of the iron-containing catalysts which are relatively less expensive than the PGM catalysts disclosed.

Next, the reformate can be exposed to a PGM catalyst of the invention in the second reaction sections at relatively a lower temperature range, preferably between 150° C. and 320° C., more preferably between 200° C. and 320° C., and even more preferably between 230–290° C. at an inlet of the second reactor section and 200–240° C. at an outlet end of the second reactor section. In so doing, a more favorable water gas shift reaction equilibrium can be obtained at the lower temperatures, hence providing a lower level of carbon monoxide. Also the PGM catalysts of the invention will have the advantages discussed herein over conventional "low temperature shift" catalysts such as those containing copper or zinc.

FIGS. 7–9 disclose alternate reformer reactors according to other aspects of the invention. In particular, both the second and third reactor sections 68, 82 and 70, 84 (FIGS. 7 and 8) contain a catalyst comprising a platinum group metal ("PGM") selected from the group consisting of platinum, palladium, iridium, osmium, rhodium and mixtures thereof (but preferably is platinum). The PGM is supported on a support material selected from the group consisting of an oxide of zirconium, titanium and mixtures thereof, but preferably zirconium oxide ($ZrO_2$). The respective reactor sections can then take advantage of the superior water gas shift catalysts of the invention in a two-stage relatively high, then relatively low temperature shift to again first take advantage of relatively higher kinetics and then a relatively more favorable equilibrium at the lower temperature. This is possible because the catalysts posses catalytic effectiveness and stability over a wide range of effective temperatures and fuels, unlike conventional copper/zinc catalysts. FIGS. 7 and 8 also disclose optional heat exchange tubes 76 and 90 with inlets 72, 88 and outlets 74, 86, respectively, for reactors 60 and 78 to provide for active cooling in the second reactor section. This is to provide a means for controlling the temperature of the catalyst and reformate to a desired range. It should be understood that the third reactor sections could also deploy such heat exchangers for the same purpose. It will also be understood by those in the art that depending on the desired effect, the coolant can be routed co-current with the reformate flow or counter-flow, depending on the desired control or conditions.

FIG. 9 discloses another exemplary embodiment according to the invention. The second reactor section 96 includes a helical heat exchange tube 102 throughout a major extent of the PGM catalyst bed. The essential distinction from the other disclosed reactors is that the reactor section 96 is configured as necessary (i.e. the form of catalyst (granules, monolith, etc.), the direction of coolant flow (co-current, counter-current), flow rates of reformate and coolant, etc.) to provide a relatively continuous gradient of temperature from an inlet end 103 of the second reactor section to the end 104 near the outlet 106 of the second reactor section. This is again to take advantage of the wide temperature range of the catalysts of the invention. The continuous gradient will be most advantageous to the extent it tracks a carbon monoxide concentration gradient through the second reactor section to give the optimal reaction kinetics/favorable equilibrium balance at all times.

The catalysts of the invention are stable in the presence of air. Thus, it is proposed that the PGM catalysts, in particular platinum, can also be used to oxidize hydrocarbons, carbon monoxide, and the hydrogen enriched stream, upon start-up of a reactor to speed the process of bringing the WGS catalyst to an effective operating temperature through the exothermic oxidation reaction. Significant hydrogen is produced at startup in a partial oxidation reaction, a steam reforming reaction or ATR. Since the hydrogen produced in the reformate during startup can not be used while carbon monoxide levels are still high, it is advantageous to use the heating value of that hydrogen rich stream to directly heat the WGS catalyst bed responsible for reducing carbon monoxide levels.

FIG. 1 discloses such an arrangement. An inlet 19 is provided to the second reactor section 18 to permit a flow of an oxygen containing gas, such as air. The air can be added to the reformate stream through the inlet 19 for a predetermined time until a desired temperature is achieved in the catalyst and/or the reformate during start up. Such a reactor configuration would be particularly useful in transportation applications where speed to full power delivery is important. In such applications it would be advantageous to be able to provide comparable speed to full power delivery now provided by internal combustion engines.

While the specific embodiments have been illustrated and described, numerous modifications come to mind without significantly departing from the spirit of the invention and the scope of protection is only limited by the scope of the accompanying Claims.

For example, the reactors described herein are described in terms of "reactor sections." It is contemplated that these sections will provide benefits according to the invention whether or not these sections are incorporated into integrated unitary structures having multiple sections or are configured as stand alone, modular sections as is desired. The inventions disclosed and claimed herein are concerned with providing reactor configurations and structures wherein "reactor sections," are coordinated and arranged to provide the sequencing of reactions necessary to accommodate the processes contemplated.

We claim:

1. A process for converting carbon monoxide and water in a reformate stream into carbon dioxide and hydrogen comprising:
   generating a reformate by reacting a hydrocarbon via a process selected from the group consisting of partial oxidation, steam reforming, and autothermal reforming; and
   catalyzing the reaction of the resultant reformate with platinum supported on an oxide of zirconium, wherein the predominant reaction within the reformate is a water gas shift reaction.

2. The process of claim 1 wherein the reacting the reformate step includes maintaining the reaction at a temperature between 200° C. to about 650° C.

3. The process of claim 2 including the step of reacting the reformate in the presence of an iron containing catalyst before reacting the reformate in the presence of the platinum group metal.

4. The process of claim 3 wherein the step of reacting the reformate in the presence of an iron containing catalyst includes maintaining the reaction at a temperature between about 300° C. and about 650° C.

5. The process of claim 3 wherein the step of reacting the reformate in the presence of an iron containing catalyst includes maintaining the reaction at a temperature between about 350° C. and about 540° C.

6. The process of claim 1, wherein the reacting the reformate step includes maintaining the reaction at a temperature in the range of from about 150° C. to about 320° C.

7. The process of claim 6 including the steps of:
   reacting the reformate in the presence of an iron containing catalyst before reacting the reformate in the presence of the platinum group metal; and,
   maintaining the reaction in the presence of the iron containing catalyst at a temperature between about 300° C. and about 650° C. when in the presence of the iron containing catalyst.

8. The process of claim 1 wherein the reacting the reformate step includes maintaining the reaction at a first temperature between about 230° C. to about 290° C. at an inlet of a reactor section containing the catalyst and at a second temperature between about 200° C. and about 240° C. at an outlet end of the reactor section.

9. The process of claim 1 including the step of reacting the reformate in the presence of an iron containing catalyst before reacting the reformate in the presence of the platinum group metal.

10. The process of claim 9 wherein the step of reacting the reformate in the presence of an iron containing catalyst includes maintaining the reaction at a temperature between about 300° C. and about 650° C.

11. The process of claim 9 wherein the step of reacting the reformate in the presence of an iron containing catalyst includes maintaining the reaction at a temperature between about 350° C. and 540° C.

12. The process of claim 1 wherein the reacting the reformate in the presence of a platinum group metal selected from the group consisting of platinum, palladium, iridium, osmium, rhodium and mixtures thereof includes reacting the reformate first in the presence of a first portion of said catalyst at a first temperature between about 300° C. to about 650° C. and then reacting the resultant reformate in the presence of a second portion of said catalyst while maintaining the reaction at a second temperature between about 200° C. and about 400° C.

13. The process of claim 1 wherein the reacting the reformate in the presence of a platinum group metal selected from the group consisting of platinum, palladium, iridium, osmium, rhodium and mixtures thereof includes reacting the reformate first in the presence of a first portion a body of said catalyst at a first temperature between about 350° C. to about 540° C. and then reacting the resultant reformate in the presence of a second portion of the body of said catalyst while maintaining the reaction at a second temperature between about 200° C. and about 400° C.

14. The process of claim 1 wherein the reacting the reformate in the presence of a platinum group metal selected from the group consisting of platinum, palladium, iridium, osmium, rhodium and mixtures thereof includes:
providing a body of said catalyst for traverse of the reformate there along from a beginning of the catalyst body through an end of the catalyst body; and,
maintaining a gradient of reaction temperatures along the body, the gradient decreasing in temperature from the beginning of the body to the end of the body.

15. The process of claim 14 wherein the gradient is defined by a first temperature near the beginning of the body between about 260° C. to about 650° C. and a second temperature near the end of the body between about 175° C. to about 345° C.

16. The process of claim 15 wherein the gradient is defined by a first temperature near the beginning of the body between about 260° C. to about 650° C. and a second temperature near the end of the body between about 175° C. to about 300° C.

17. The process of claim 1 wherein the step of reacting the reformate in the presence of a platinum group metal selected from the group consisting of platinum, palladium, iridium, osmium, rhodium and mixtures thereof, includes:
introducing a predetermined amount of oxygen into the reformate for a desired period of time; and,
promoting oxidation of constituents in the reformate by the presence of the catalyst to generate heat to a desired temperature in the catalyst.

18. The process of claim 1 wherein the generating step includes generating a reformate having a carbon monoxide concentration of greater than about 10% by volume.

19. The process of claim 18 wherein the generating step includes generating a reformate having a water concentration of greater than about 15% by volume.

20. The process of claim 19 wherein the generating step includes generating a reformate having an aliphatic hydrocarbon concentration between about 0.01% to about 0.50% by volume.

21. The process of claim 20 wherein the generating step includes generating a reformate having one or more non-aliphatic hydrocarbon constituents selected from the group consisting of: an alcohol, an ester, an ether, an acid, an aldehyde, an unsaturated non-aromatic, an aromatic, and a cyclic.

22. The process of claim 1 wherein the generating step includes generating a reformate having a water concentration of greater than about 15% by volume.

23. The process of claim 1 wherein the generating step includes generating a reformate having an aliphatic hydrocarbon concentration between about 0.01% to about 0.50% by volume.

24. The process of claim 1 wherein the generating step includes generating a reformate having one or more non-aliphatic hydrocarbon constituents selected from the group consisting of: an alcohol, an ester, an ether, an acid, an aldehyde, an unsaturated non-aromatic, an aromatic, and a cyclic.

25. The process of claim 1 wherein the generating step includes generating a reformate that includes hydrogen sulfide.

26. The process of claim 1 wherein the generating step includes partial oxidation and the reformate includes ammonia.

27. The process of claim 1 including the initial step of forming a monolithic base from zirconium oxide and supporting the platinum group metal directly on the monolith.

28. The process of claim 1, wherein the reacting the reformate step includes maintaining the reaction at a temperature in the range of from about 200° C. to about 320° C.

29. The process of claim 1, wherein the reacting the reformate step includes maintaining the reaction at a temperature in the range of from about 230° C. to about 290° C.

30. A process for converting carbon monoxide and water in a reformate stream into carbon dioxide and hydrogen comprising:
generating a reformate by reacting a hydrocarbon via a process selected from the group consisting of partial oxidation, steam reforming, and ATR;
reacting the resulting reformate predominantly by a water gas shift reaction in the presence of a platinum group metal selected from the group consisting of platinum, palladium, iridium, osmium, rhodium and mixtures thereof; and
wherein the platinum group metal is supported on a material selected from the group consisting of an oxide of zirconium, titanium and mixtures thereof.

31. The process of claim 30 wherein the reacting the reformate step includes maintaining the reaction at a temperature between about 200° C. to about 650° C.

32. The process of claim 30 wherein the reacting the reformate step includes maintaining the reaction at a temperature between about 200° C. to about 320° C.

33. The process of claim 32 including the steps of:
reacting the reformate in the presence of an iron containing catalyst before reacting the reformate in the presence of the platinum group metal; and,
maintaining the reaction in the presence of the iron containing catalyst at a temperature between about 300° C. and about 650° C. when in the presence of the iron containing catalyst.

34. The process of claim 30 wherein the reacting the reformate step includes maintaining the reaction at a first temperature between about 230° C. to about 290° C. at an inlet of a reactor section containing the catalyst and at a second temperature between about 200° C. and about 240° C. at an outlet end of the reactor section.

35. The process of claim 30 including the step of reacting the reformate in the presence of an iron containing catalyst before reacting the reformate in the presence of the platinum group metal.

36. The process of claim 35 wherein the step of reacting the reformate in the presence of an iron containing catalyst includes maintaining the reaction at a temperature between about 300° C. and about 650° C.

37. The process of claim 35 wherein the step of reacting the reformate in the presence of an iron containing catalyst includes maintaining the reaction at a temperature between about 350° C. and about 540° C.

38. The process of claim 30 wherein the reacting the reformate in the presence of a platinum group metal selected from the group consisting of platinum, palladium, iridium, osmium, rhodium and mixtures thereof includes reacting the reformate first in the presence of a first portion of said catalyst at a first temperature between about 300° C. to about 650° C. and then reacting the resultant reformate in the presence of a second portion of said catalyst while maintaining the reaction at a second temperature between about 200° C. and about 400° C.

39. The process of claim 30 wherein the reacting the reformate in the presence of a platinum group metal selected from the group consisting of platinum, palladium, iridium, osmium, rhodium and mixtures thereof includes reacting the reformate first in the presence of a first portion of said catalyst at a first temperature between about 300° C. to about 540° C. and then reacting the resultant reformate in the presence of a second portion of said catalyst while maintaining the reaction at a second temperature between about 200° C. and about 400° C.

40. The process of claim 30 wherein the reacting the reformate in the presence of a platinum group metal selected from the group consisting of platinum, palladium, iridium, osmium, rhodium and mixtures thereof includes:

providing a body of said catalyst for traverse of the reformate there along from a beginning of the catalyst body through an end of the catalyst body; and, maintaining a gradient of reaction temperatures along the body, the gradient decreasing in temperature from the beginning of the body to the end of the body.

41. The process of claim 40 wherein the gradient is defined by a first temperature near the beginning of the body between about 260° C. to about 650° C. and a second temperature near the end of the body between about 175° C. to about 345° C.

42. The process of claim 40 wherein the gradient is defined by a first temperature near the beginning of the body between about 350° C. to about 650° C. and a second temperature near the end of the body between about 175° C. to about 275° C.

43. The process of claim 30 wherein the reacting the reformate step includes maintaining the reaction at a temperature between about 150° C. to about 250° C.

44. The process of claim 30 wherein the step of reacting the reformate in the presence of a platinum group metal selected from the group consisting of platinum, palladium, iridium, osmium, rhodium and mixtures thereof, includes:

introducing a predetermined amount of oxygen into the reformate for a desired period of time; and, promoting oxidation of constituents in the reformate by the presence of the catalyst to generate heat to a desired temperature in the catalyst.

45. The process of claim 30 wherein the generating step includes generating a reformate having a carbon monoxide concentration of greater than about 10% by volume.

46. The process of claim 45 wherein the generating step includes generating a reformate having a water concentration of greater than about 15% by volume.

47. The process of claim 46 wherein the generating step includes generating a reformate having an aliphatic hydrocarbon concentration between about 0.01% to about 0.50% by volume.

48. The process of claim 47 wherein the generating step includes generating a reformate having one or more non-aliphatic hydrocarbon constituents selected from the group consisting of: an alcohol, an ester, an ether, an acid, an aldehyde, an unsaturated non-aromatic, an aromatic, and a cyclic.

49. The process of claim 30 wherein the generating a reformate step provides a resulting reformate having carbon monoxide, carbon dioxide, nitrogen, hydrogen, and water, wherein the water constitutes above 10% of the reformate by volume.

50. The process of claim 30 wherein the generating step includes generating a reformate having a water concentration of greater than about 15% by volume.

51. The process of claim 30 wherein the generating step includes generating a reformate having an aliphatic hydrocarbon concentration between about 0.01% to about 0.50% by volume.

52. The process of claim 30 wherein the generating step includes generating a reformate having one or more non-aliphatic, carbon-based constituents selected from the group consisting of: an alcohol, an ester, an ether, an acid, an aldehyde, an unsaturated non-aromatic, an aromatic, and a cyclic.

53. The process of claim 30 wherein the generating step includes generating a reformate having an amount of unconverted hydrocarbon fuel.

54. The process of claim 30 wherein the generating step includes generating a reformate that includes hydrogen sulfide.

55. The process of claim 30 wherein the generating step includes partial oxidation and the reformate includes ammonia.

56. A process for converting carbon monoxide and water in a reformate stream into carbon dioxide and hydrogen comprising:

generating a reformate by reacting a hydrocarbon via at least a steam reforming reaction;

promoting a water gas shift reaction in the resulting reformate in the presence of a platinum group metal selected from the group consisting of platinum, palladium, iridium, osmium, rhodium and mixtures thereof; and wherein the platinum group metal is supported on an oxide of a material selected from the group consisting of zirconium, titanium and mixtures thereof.

* * * * *